United States Patent
Jain et al.

(10) Patent No.: US 10,332,009 B2
(45) Date of Patent: Jun. 25, 2019

(54) PREDICTING USER NAVIGATION EVENTS

(71) Applicant: Google Inc., Mountain View, CA (US)

(72) Inventors: Arvind Jain, Los Altos, CA (US); Dominic Hamon, San Francisco, CA (US)

(73) Assignee: Google LLC, Mountain View, CA (US)

(*) Notice: Subject to any disclaimer, the term of this patent is extended or adjusted under 35 U.S.C. 154(b) by 141 days.

(21) Appl. No.: 15/657,315

(22) Filed: Jul. 24, 2017

(65) Prior Publication Data

US 2018/0032877 A1    Feb. 1, 2018

Related U.S. Application Data

(63) Continuation of application No. 14/136,136, filed on Dec. 20, 2013, now Pat. No. 9,846,842, which is a continuation of application No. 13/174,925, filed on Jul. 1, 2011, now Pat. No. 8,650,139.

(51) Int. Cl.
  *G06N 5/02* (2006.01)
  *G06F 16/957* (2019.01)

(52) U.S. Cl.
  CPC ......... *G06N 5/022* (2013.01); *G06F 16/9574* (2019.01); *G06F 16/9577* (2019.01)

(58) Field of Classification Search
  CPC ............ G06N 5/02; G06N 5/04; G06N 7/005; G06Q 50/01
  See application file for complete search history.

(56) References Cited

U.S. PATENT DOCUMENTS

| | | |
|---|---|---|
| 5,715,445 A | 2/1998 | Wolfe |
| 5,727,129 A | 3/1998 | Barrett et al. |
| 5,745,910 A | 4/1998 | Piersol et al. |
| 5,878,223 A | 3/1999 | Becker et al. |
| 5,946,682 A | 8/1999 | Wolfe |
| 6,034,689 A | 3/2000 | White et al. |
| 6,055,569 A | 4/2000 | O'Brien et al. |
| 6,067,565 A | 5/2000 | Horvitz |
| 6,085,226 A | 7/2000 | Horvitz |
| 6,098,064 A | 8/2000 | Pirolli et al. |
| 6,100,871 A | 8/2000 | Min |

(Continued)

OTHER PUBLICATIONS

International Search Report & Written Opinion dated May 7, 2013 for Application No. PCT/US2013/021927.

(Continued)

*Primary Examiner* — Paulinho E Smith
(74) *Attorney, Agent, or Firm* — Botos Churchill IP Law LLP

(57) ABSTRACT

A method and system for predicting a next navigation event are described. Aspects of the disclosure minimize the delay between a navigation event and a network response by predicting the next navigation event. The system and method may then prerender content associated with the next navigation event. For example, the method and system may predict a likely next uniform resource locator during web browsing to preemptively request content from the network before the user selects the corresponding link on a web page. The methods describe a variety of manners of predicting the next navigation event, including examining individual and aggregate historical data, text entry prediction, and cursor input monitoring.

21 Claims, 13 Drawing Sheets

(56) References Cited

U.S. PATENT DOCUMENTS

| | | |
|---|---|---|
| 6,151,585 A | 11/2000 | Altschuler et al. |
| 6,151,603 A | 11/2000 | Wolfe |
| 6,182,133 B1 | 1/2001 | Horvitz |
| 6,256,712 B1 | 7/2001 | Challenger et al. |
| 6,301,576 B1 | 10/2001 | Wolfe |
| 6,323,884 B1 | 11/2001 | Bird et al. |
| 6,385,641 B1 | 5/2002 | Jiang et al. |
| 6,467,029 B1 | 10/2002 | Kitayama |
| 6,540,143 B1 | 4/2003 | Matsumori |
| 6,553,393 B1 | 4/2003 | Eilbott et al. |
| 6,604,103 B1 | 8/2003 | Wolfe |
| 6,718,454 B1 | 4/2004 | Ebner et al. |
| 6,976,090 B2 | 12/2005 | Ben-Shaul et al. |
| 6,981,017 B1 | 12/2005 | Kasriel et al. |
| 7,047,502 B2 | 5/2006 | Petropoulos et al. |
| 7,103,594 B1 | 9/2006 | Wolfe |
| 7,155,336 B2 | 12/2006 | Dorfman et al. |
| 7,155,489 B1 | 12/2006 | Heilbron et al. |
| 7,277,924 B1 | 10/2007 | Wichmann et al. |
| 7,428,701 B1 | 9/2008 | Gavin et al. |
| 7,467,137 B1 | 12/2008 | Wolfe |
| 7,480,669 B2 | 1/2009 | Lo et al. |
| 7,487,147 B2 | 2/2009 | Bates et al. |
| 7,499,940 B1 | 3/2009 | Gibbs |
| 7,536,635 B2 | 5/2009 | Racovolis et al. |
| 7,562,115 B2 | 7/2009 | Zircher et al. |
| 7,613,712 B2 | 11/2009 | Greenblatt et al. |
| 7,631,032 B1 | 12/2009 | Refuah et al. |
| 7,660,815 B1 | 2/2010 | Scofield et al. |
| 7,685,192 B1 | 3/2010 | Scofield et al. |
| 7,716,332 B1 | 5/2010 | Topfl et al. |
| 7,747,749 B1 | 6/2010 | Erikson et al. |
| 7,788,601 B2 | 8/2010 | Scott |
| 7,802,305 B1 | 9/2010 | Leeds |
| 7,805,673 B2 | 9/2010 | der Quaeler et al. |
| 7,840,589 B1 | 11/2010 | Holt et al. |
| 7,876,335 B1 | 1/2011 | Pittenger et al. |
| 7,908,336 B2 | 3/2011 | Carlson et al. |
| 7,987,172 B1 | 7/2011 | Carver |
| 8,112,308 B1 | 2/2012 | Ho et al. |
| 8,260,938 B2 | 9/2012 | Gupta et al. |
| 8,352,412 B2 | 1/2013 | Alba et al. |
| 8,356,247 B2 | 1/2013 | Krassner et al. |
| 8,386,509 B1 | 2/2013 | Scofield et al. |
| 8,391,461 B2 | 3/2013 | Skakkebaek et al. |
| 8,402,481 B1 | 3/2013 | Urbach |
| 8,504,907 B2 | 8/2013 | Piersol |
| 8,549,497 B2 | 10/2013 | Ghorbani et al. |
| 8,566,696 B1* | 10/2013 | Hamon ................ G06F 16/957 715/205 |
| 8,600,968 B2 | 12/2013 | Holenstein et al. |
| 8,631,340 B2 | 1/2014 | Schreiner et al. |
| 8,655,819 B1* | 2/2014 | Burkard ................ G06N 5/048 706/45 |
| 8,688,702 B1 | 4/2014 | Chapman |
| 8,744,988 B1* | 6/2014 | Hamon ............... G06F 17/2235 706/45 |
| 8,745,212 B2 | 6/2014 | Jain et al. |
| 8,788,711 B2 | 7/2014 | Burkard et al. |
| 8,892,638 B2 | 11/2014 | Chang et al. |
| 9,628,359 B1* | 4/2017 | Jain .................... H04L 43/0811 |
| 2001/0037400 A1 | 11/2001 | Raz et al. |
| 2002/0075333 A1 | 6/2002 | Dutta et al. |
| 2003/0005038 A1 | 1/2003 | Codella et al. |
| 2003/0050906 A1 | 3/2003 | Clifton-Bligh |
| 2003/0061451 A1 | 3/2003 | Beyda |
| 2003/0088573 A1 | 5/2003 | Stickler |
| 2003/0088580 A1 | 5/2003 | Desai et al. |
| 2003/0182390 A1 | 9/2003 | Alam |
| 2003/0193994 A1 | 10/2003 | Stickler |
| 2003/0195940 A1 | 10/2003 | Basu et al. |
| 2003/0212760 A1 | 11/2003 | Chen et al. |
| 2004/0031052 A1 | 2/2004 | Wannamaker et al. |
| 2004/0148470 A1 | 7/2004 | Schulz |
| 2004/0267600 A1 | 12/2004 | Horvitz |
| 2004/0268228 A1 | 12/2004 | Croney et al. |
| 2005/0027823 A1 | 2/2005 | Rana |
| 2005/0055426 A1 | 3/2005 | Smith et al. |
| 2005/0132296 A1 | 6/2005 | Milic-Frayling et al. |
| 2005/0240576 A1 | 10/2005 | Piscitello et al. |
| 2005/0251396 A1 | 11/2005 | Tyler |
| 2005/0283468 A1 | 12/2005 | Kamvar et al. |
| 2006/0047804 A1 | 3/2006 | Fredricksen et al. |
| 2006/0055696 A1 | 3/2006 | Loberg |
| 2006/0064411 A1 | 3/2006 | Gross et al. |
| 2006/0143568 A1 | 6/2006 | Milener et al. |
| 2006/0184902 A1 | 8/2006 | Hayes et al. |
| 2006/0282771 A1 | 12/2006 | Vinci |
| 2007/0005425 A1 | 1/2007 | Bennett et al. |
| 2007/0060363 A1 | 3/2007 | Nguyen et al. |
| 2007/0198634 A1 | 8/2007 | Knowles et al. |
| 2007/0204057 A1 | 8/2007 | Shaver et al. |
| 2007/0208704 A1 | 9/2007 | Ives |
| 2007/0220010 A1 | 9/2007 | Ertugrul |
| 2007/0226633 A1 | 9/2007 | Lyle et al. |
| 2007/0260585 A1 | 11/2007 | Bodine et al. |
| 2007/0288648 A1 | 12/2007 | Mehanna et al. |
| 2008/0052219 A1 | 2/2008 | Sandholm et al. |
| 2008/0104407 A1 | 5/2008 | Horne et al. |
| 2008/0130951 A1 | 6/2008 | Wren et al. |
| 2008/0140941 A1 | 6/2008 | Dasgupta et al. |
| 2008/0201332 A1 | 8/2008 | Souders et al. |
| 2008/0208789 A1 | 8/2008 | Almog |
| 2008/0249969 A1 | 10/2008 | Tsui et al. |
| 2008/0256134 A1 | 10/2008 | Bogner et al. |
| 2008/0276248 A1 | 11/2008 | Xu et al. |
| 2008/0295006 A1 | 11/2008 | LuVogt et al. |
| 2008/0320222 A1 | 12/2008 | Dhodapkar |
| 2009/0013006 A1 | 1/2009 | Friedl et al. |
| 2009/0070392 A1 | 3/2009 | Le Roy et al. |
| 2009/0094196 A1 | 4/2009 | Piwowarski et al. |
| 2009/0106349 A1 | 4/2009 | Harris |
| 2009/0132949 A1 | 5/2009 | Bosarge |
| 2009/0158221 A1 | 6/2009 | Nielsen et al. |
| 2009/0171930 A1 | 7/2009 | Vaughan et al. |
| 2009/0198809 A1 | 8/2009 | Goto et al. |
| 2009/0210806 A1 | 8/2009 | Dodson et al. |
| 2009/0216639 A1 | 8/2009 | Kapczynski et al. |
| 2009/0254515 A1 | 10/2009 | Terheggen et al. |
| 2009/0254643 A1 | 10/2009 | Terheggen et al. |
| 2009/0265774 A1* | 10/2009 | Malik .................... G06F 21/41 726/7 |
| 2009/0299964 A1 | 12/2009 | Cameron et al. |
| 2009/0327260 A1 | 12/2009 | Li et al. |
| 2009/0327424 A1 | 12/2009 | Bernstein et al. |
| 2010/0005061 A1 | 1/2010 | Basco et al. |
| 2010/0017696 A1 | 1/2010 | Choudhary et al. |
| 2010/0023581 A1 | 1/2010 | Lahav |
| 2010/0031366 A1 | 2/2010 | Knight et al. |
| 2010/0064314 A1 | 3/2010 | Li et al. |
| 2010/0107115 A1 | 4/2010 | Sareen et al. |
| 2010/0131902 A1 | 5/2010 | Teran et al. |
| 2010/0191799 A1 | 7/2010 | Fiedorowicz et al. |
| 2010/0191856 A1 | 7/2010 | Gupta et al. |
| 2010/0235574 A1 | 9/2010 | Umezuki |
| 2010/0251116 A1 | 9/2010 | Rimas-Ribikauskas et al. |
| 2010/0306665 A1 | 12/2010 | Milic-Frayling et al. |
| 2010/0312858 A1 | 12/2010 | Mickens et al. |
| 2011/0029518 A1 | 2/2011 | Tong |
| 2011/0029670 A1 | 2/2011 | Klein et al. |
| 2011/0066732 A1 | 3/2011 | Iwade et al. |
| 2011/0093790 A1 | 4/2011 | Maczuba |
| 2011/0119361 A1 | 5/2011 | Issa et al. |
| 2011/0173569 A1 | 7/2011 | Howes et al. |
| 2011/0199304 A1 | 8/2011 | Walley et al. |
| 2011/0225494 A1 | 9/2011 | Shmuylovich et al. |
| 2011/0238615 A1 | 9/2011 | Sinha |
| 2011/0247081 A1 | 10/2011 | Shelton |
| 2011/0271217 A1 | 11/2011 | Cruz Moreno et al. |
| 2011/0289317 A1 | 11/2011 | Darapu et al. |
| 2012/0005058 A1 | 1/2012 | Buck |
| 2012/0017146 A1 | 1/2012 | Travieso et al. |
| 2012/0059911 A1 | 3/2012 | Randhawa et al. |
| 2012/0084644 A1 | 4/2012 | Robert et al. |

(56) References Cited

U.S. PATENT DOCUMENTS

| | | |
|---|---|---|
| 2012/0110435 A1 | 5/2012 | Green |
| 2012/0137201 A1 | 5/2012 | White et al. |
| 2012/0151308 A1 | 6/2012 | Falkenberg et al. |
| 2012/0158740 A1 | 6/2012 | Smola et al. |
| 2012/0254721 A1 | 10/2012 | Jain et al. |
| 2012/0254727 A1 | 10/2012 | Jain et al. |
| 2012/0254780 A1 | 10/2012 | Mouton et al. |
| 2012/0284597 A1* | 11/2012 | Burkard ............. G06F 17/2235 715/205 |
| 2012/0290924 A1 | 11/2012 | Vick et al. |
| 2012/0324043 A1 | 12/2012 | Burkard et al. |
| 2013/0006897 A1* | 1/2013 | Jain .................... G06F 16/9577 706/12 |
| 2013/0007260 A1 | 1/2013 | Jain et al. |
| 2013/0067170 A1 | 3/2013 | Lam |
| 2013/0073509 A1* | 3/2013 | Burkard ................ G06N 5/048 706/52 |
| 2013/0185633 A1 | 7/2013 | Bunker et al. |
| 2015/0200994 A1* | 7/2015 | Jain ........................ H04L 67/02 709/219 |

OTHER PUBLICATIONS

International Search Report and Written Opinion dated Dec. 14, 2012 for PCT application PCT/US2012/044896.

International Search Report and Written Opinion for Application No. PCT/US2012/042186 dated Feb. 20, 2013.

International Search Report and Written Opinion for Application No. PCT/US2012/055473 dated Feb. 26, 2013.

International Search Report and Written Opinion for Application No. PCT/US2013/062245 dated Jan. 28, 2014.

International Search Report dated Nov. 28, 2012, in International Application No. PCT/US2012/036519.

U.S. Appl. No. 13/100,615, filed May 4, 2011.
U.S. Appl. No. 13/174,928, filed Jul. 1, 2011.
U.S. Appl. No. 13/174,925, filed Jul. 1, 2011.
U.S. Appl. No. 13/175,067, filed Jul. 1, 2011.
U.S. Appl. No. 13/175,115, filed Jul. 1, 2011.
U.S. Appl. No. 13/182,920, filed Jul. 14, 2011.
U.S. Appl. No. 13/183,824, filed Jul. 15, 2011.
U.S. Appl. No. 13/233,300, filed Sep. 15, 2011.
U.S. Appl. No. 13/233,314, filed Sep. 15, 2011.
U.S. Appl. No. 13/268,279, filed Oct. 7, 2011.
U.S. Appl. No. 13/308,757, filed Dec. 1, 2011.
U.S. Appl. No. 13/353,626, filed Jan. 19, 2012.
U.S. Appl. No. 13/472,019, filed May 15, 2012.

Notice of Allowance for Korean Patent Application No. 10-2014-7009072 dated Jan. 4, 2018.

* cited by examiner

PREDICTING USER NAVIGATION EVENTS

CROSS-REFERENCE TO RELATED APPLICATIONS

The present application is a continuation of U.S. patent application Ser. No. 14/136,136, filed on Dec. 20, 2013, which is a continuation of U.S. patent application Ser. No. 13/174,925 filed Jul. 1, 2011, now U.S. Pat. No. 8,650,139, the disclosures of which are incorporated herein by reference.

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for predicting user navigation events are described. Aspects of the disclosure minimize the delay in accessing web content by predicting a user navigation event on a web page. The navigation event may be predicted by various indicators, including but not limited to a user's navigation history, aggregate navigation history, text entry within a data entry field, or a mouse cursor position. Users can be provided with an opportunity to op in/out of functionality that may collect personal information about users. In addition, certain data can be anonymized and aggregated before it is stored or used, such that personally identifiable information is removed.

Aspects of the disclosure provide a computer-implemented method for predicting a user navigation event. The method may include tracking a first text input to a text field using a computer processor, the text field functioning to direct network navigation operations of a web browser, consulting a set of probability data to determine a most likely network navigation destination using the text input, and prerendering the most likely network navigation destination using the web browser. The method may also include generating the set of probability data by a method comprising, monitoring one or more previous text inputs to the text field, displaying one or more potential network navigation destinations associated with each of the previous text inputs in response to the one or more previous text inputs, and storing selection data indicating whether the displayed one or more potential network navigation destinations were selected, the data associating each of the one or more previous text inputs with the one or more potential network navigation destinations. The probability data may be indexed by the previous text inputs. In some aspects, the probability data may be indexed by an identifier comprising one of the previous text inputs and a likely network navigation destination. The method may include updating the set of probability data after every navigation event. In some aspects, the method may include determining a probability value for a given network navigation destination associated with the text entry by using the probability data, determining that the probability value exceeds a threshold value, and prerendering the given network navigation destination in response to the probability value exceeding the threshold value. The method may include determining that a plurality of probability values associated with a plurality of network navigation destinations exceed the threshold value, and prerendering each of the plurality of network navigation destinations for which the associated probability value exceeds the threshold value. The text field may include a web browser address bar. In some aspects, the method may include repeating the tracking, the consulting, and the prerendering method as each of a plurality of characters is entered in the text field.

Aspects of the disclosure provide a non-transitory computer-readable storage medium comprising instructions that, when executed by a processor, cause the processor to perform a method. The method may include tracking a first text input to a text field using a computer processor, the text field functioning to direct network navigation operations of a web browser, consulting a set of probability data to determine a most likely network navigation destination using the text input, and prerendering the most likely network navigation destination using the web browser. The instructions may also include generating the set of probability data by a method including monitoring one or more previous text inputs to the text field, displaying one or more potential network navigation destinations associated with each of the previous text inputs in response to the one or more previous text inputs, and storing selection data indicating whether the displayed one or more potential network navigation destinations were selected, the data associating each of the one or more previous text inputs with the one or more potential network navigation destinations. The probability data may be indexed by the previous text inputs. In some aspects, the probability data may be indexed by an identifier comprising one of the previous text inputs and a likely network navigation destination. The instructions may include updating the set of probability data after every navigation event. In some aspects, the instructions may include determining a probability value for a given network navigation destination associated with the text entry by using the probability data, determining that the probability value exceeds a threshold value, and prerendering the given network navigation destination in response to the probability value exceeding the threshold value. The instructions may further include determining that a plurality of probability values associated with a plurality of network navigation destinations exceed the threshold value, and prerendering each of the plurality of network navigation destinations for which the associated probability value exceeds the threshold value. The text field may include a web browser address bar. In some aspects, the instructions may include repeating the tracking, the consulting, and the prerendering method as each of a plurality of characters is entered in the text field.

Aspects of the disclosure may provide a processing system for predicting a user navigation event. The processing system may include at least one processor, and a memory, coupled to the processor, for storing a set of probability data, the set of probability data comprising one or more text entries, one or more network navigation destinations associated with the text entries, and a probability that a given network navigation destination will be selected for each of the text entries. The processor may be configured to process text input in a text field, the text field functioning to direct network navigation operations of a web browser, determine one or more possible network navigation destinations from the text input, determine a most likely network navigation destination using the set of probability data, and execute the web browser to prerender the most likely network navigation destination. The processor may be further configured to monitor one or more previous text inputs to the text field, display one or more potential network navigation destinations associated with each of the previous text inputs in response to the one or more previous text inputs, and store selection data indicating whether the displayed one or more potential network navigation destinations were selected, the selection data associating each of the one or more previous text inputs with the one or more potential network navigation destinations. In some aspects, the processor may be configured to determine a probability value for a given network navigation destination associated with the text entry by using the probability data, determine that the probability value exceeds a threshold value, and prerender the given network navigation destination in response to the probability value exceeding the threshold value. The processing system may be configured to update the set of probability data after every navigation event.

DETAILED DESCRIPTION

Embodiments of a system and method for predicting user navigation events are described herein. Aspects of this disclosure minimize the delay between a navigation event and a network response by predicting the next navigation event. The system and method may prerender content associated with the next navigation event. For example, the method and system may predict a likely next uniform resource locator during web browsing to preemptively request content from the network before the user selects the corresponding link, thus reducing or eliminating the wait time when a user selects a hyperlink on a web page. Various methods describing a variety of manners of predicting the next navigation event, including examining individual and aggregate historical data, text entry prediction, and cursor input monitoring are described. Aspects of the disclosure relate to the prediction of the immediate user navigation (e.g. the next link the user is likely to select when viewing a particular web page, such as within the next 30 seconds, the next minute, or the next 5 minutes).

Figure 1:
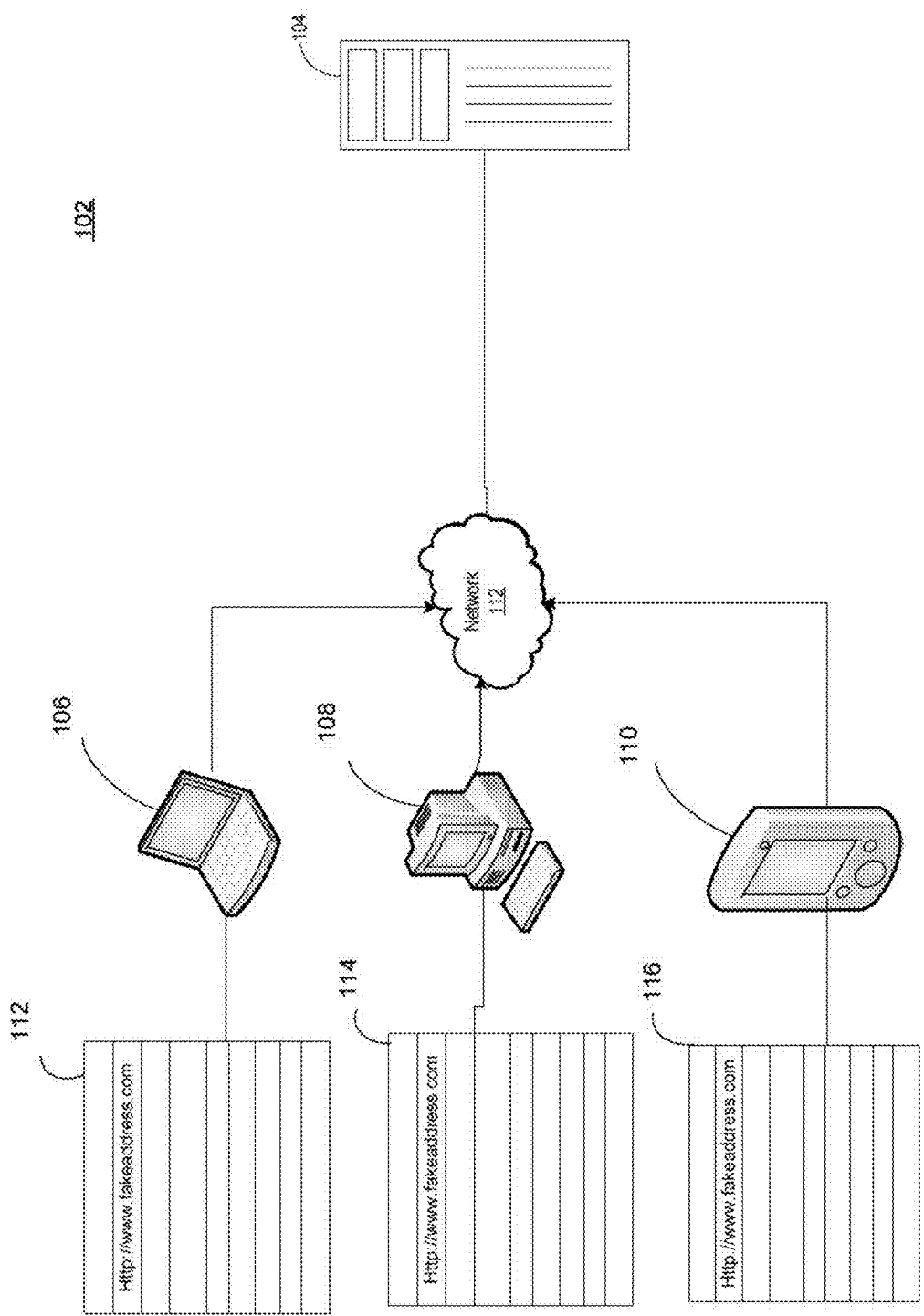
FIG. 1 is a system diagram depicting an example of a server in communication with example client devices in accordance with aspects of the disclosure.

As shown in FIG. 1, an example system 100 in accordance with one embodiment includes a server 104 in communication (via a network 112) with one or more client devices 106, 108, 110 displaying web browser interfaces 114, 116, 118.

The client devices 106, 108, 110 are operable to perform prerendering operations during the execution of a web browser application. The server 104 may transmit navigation history data to the client devices 106, 108, 110, to enable prediction of a next navigation event. In some aspects, the client devices 106, 108, 110 determine a next navigation event using a local navigation history and generate a web request to the server 104 to prerender the content associated with the next navigation event. For example, the user of the client device 106 may browse to a web page located at "www.fakeaddress.com" as displayed on the web browser interface 112. That page includes content selectable by the user. Based on the user's navigation history, the client device 106 may determine which of the selectable content the user is likely to select, and then prerender the content associated with the selectable content by requesting the content from the server 104.

As another example, the client device 108 may display www.fakeaddress.com within a browser 114. The client device 108 may receive an aggregate set of navigation statistics from the server 104, and then determine which selectable content the user is likely to select based upon the aggregate set of navigation statistics. As yet another example, the client device 110 may display www.fakeaddress.com within a browser 116. The client device 108 may determine which selectable content the user is likely to select based upon a cursor position within the browser 114.

While the concepts described herein are generally discussed with respect to a web browser, aspects of the disclosure can be applied to any computing node capable of managing navigation events over a network, including a server 104.

The client devices 106, 108, 110 may be any device capable managing data requests via a network 112. Examples of such client devices include a personal computer (PC) 108, a mobile device 110, or a server 104. The client devices 106, 108, 110 may also comprise personal computers, personal digital assistants ("PDA"): tablet PCs, netbooks, etc. Indeed, client devices in accordance with the systems and methods described herein may comprise any device operative to process instructions and transmit data to and from humans and other computers including general purpose computers, network computers lacking local storage capability, etc.

The client devices 106, 108, 110 are operable to predict navigation events to assist in data access on the network 112. For example, the client devices may predict a likely navigation event to facilitate prerendering of a web page in order to improve the user's browsing experience. In some aspects, the server 104 provides navigation data that may be used by the client devices 106, 108, 110 to predict a likely navigation event (See FIGS. 6-8). In some aspects, the client devices 106, 108, 110 predict a likely navigation event using local data. (See FIGS. 3-5, 9-12).

The network 112, and the intervening nodes between the server 104 and the client devices 106, 108, 110, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 104 and other functions are indicated as taking place on the client devices 106, 108, 110, various aspects of the system and method may be implemented by a single computer having a single processor. It should be appreciated that aspects of the system and method described with respect to the client may be implemented on the server, and vice-versa.

Figure 2:
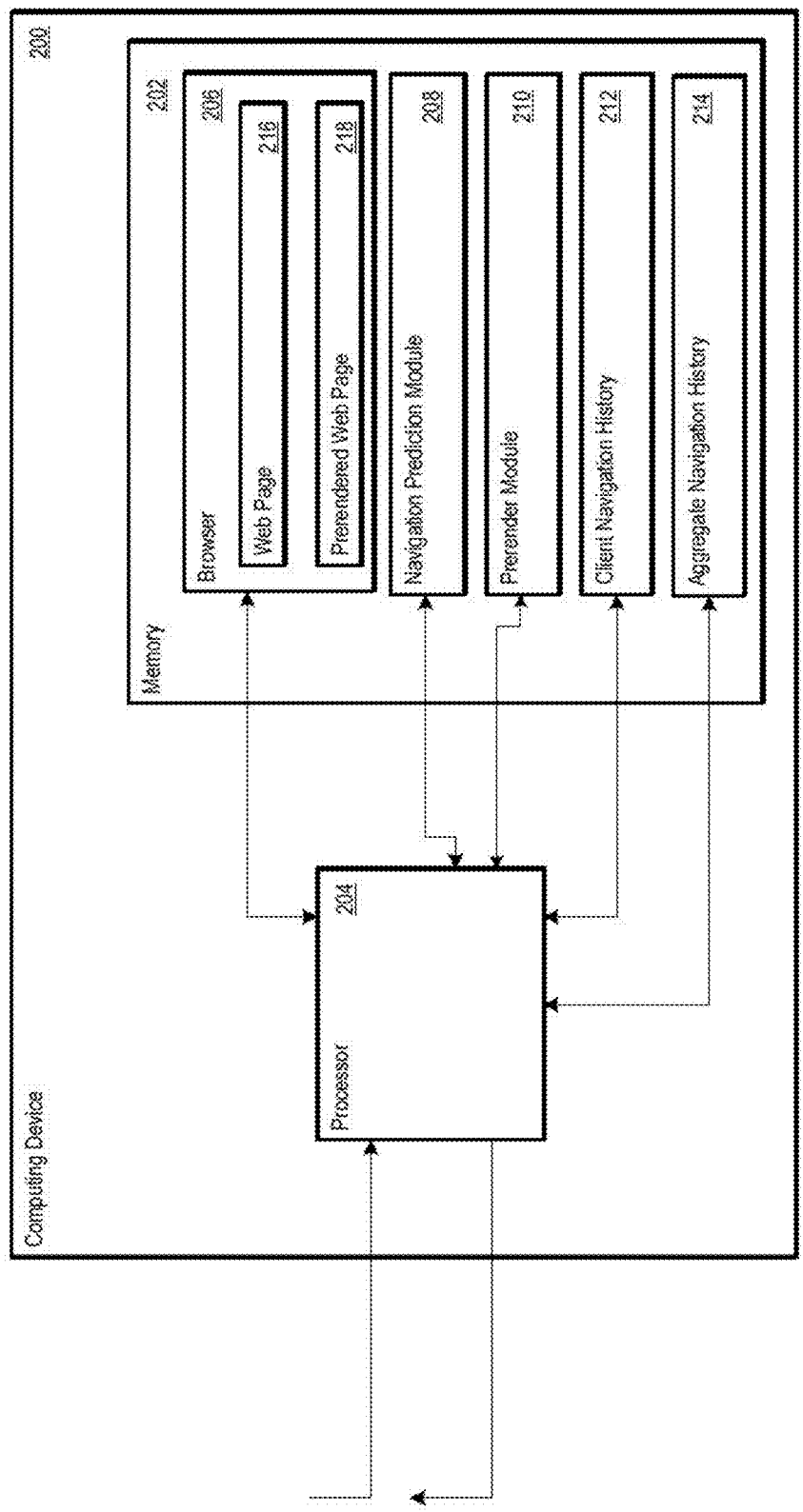
FIG. 2 is block diagram depicting an example computing device in accordance with aspects of the disclosure.

FIG. 2 is a block diagram depicting an example of a computing device 200, such as one of the client devices 106, 108, 110 described with respect to FIG. 1. The computing device 200 may include a processor 204, a memory 202 and other components typically present in general purpose computers. The memory 202 may store instructions and data that are accessible by the processor 204. The processor 204 may execute the instructions and access the data to control the operations of the computing device 200.

The memory 202 may be any type of memory operative to store information accessible by the processor 120, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions may be any set of instructions to be executed directly (such as machine code) or indirectly (such as scripts) by the processor 204. For example, the instructions may be stored as computer code on a computer-readable medium. In that regard, the terms "instructions" and "programs" may be used interchangeably herein. The instructions may be stored in object code format for direct processing by the processor 204, or in any other computer language including scripts or collections of independent source code modules that are interpreted on demand or compiled in advance. Functions, methods and routines of the instructions are explained in more detail below (See FIGS. 3-12).

Data may be retrieved, stored or modified by processor in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 204 may be any suitable processor, such as various commercially available general purpose processors. Alternatively, the processor may be a dedicated controller such as an application-specific integrated circuit ("ASIC").

Although FIG. 2 functionally illustrates the processor and memory as being within a single block, it should be understood that the processor 204 and memory 202 may comprise multiple processors and memories that may or may not be stored within the same physical housing. Accordingly, references to a processor, computer or memory will be understood to include references to a collection of processors, computers or memories that may or may not operate in parallel.

The computing device 200 may be at one node of a network and be operative to directly and indirectly communicate with other nodes of the network. For example, the computing device 200 may comprise a web server that is operative to communicate with client devices via the network such that the computing device 200 uses the network to transmit and display information to a user on a display of the client device.

In some examples, the system provides privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed.

In order to facilitate the navigation event prediction operations of the computing device 200, the memory 202 may further comprise a browser 206, a navigation prediction module 208, a prerender module 210, a client navigation history 212, and an aggregate navigation history 214. Although a number of discrete modules (e.g., 206, 208, 210, 212 and 214) are identified in connection with FIG. 2, the functionality of these modules can overlap and/or exist in a fewer or greater number of modules than what is shown, with such modules residing at one or more processing devices, which may be geographically dispersed. The browser 206 provides for the display of a web page 216 to a user of the client device by sending and receiving data across a computer network. The web page 216 may be received in response to a network request, such as a Hypertext Transfer Protocol (HTTP) GET request. The web page 216 may be provided in a markup language, such as Hypertext Markup Language (HTML). The web page 216 may also include various scripts, data, forms, and the like, including interactive and executable content such as ADOBE FLASH content, JAVASCRIPT content, and the like.

The browser 206 may further comprise a prerendered web page 218. The prerendered web page 218 represents a web page that was requested and accessed by the prerender module 210 in response to a predicted navigation event provided by the navigation prediction module 208. In the event the user inputs a navigation event as predicted by the prediction module 208, the browser 206 may swap the prerendered web page 218 with the web page 216, thus providing the content associated with the navigation event without the need to send another network request. In some aspects, the swap may occur before the prerendered web page 218 has finished loading. In such cases, the partially loaded prerendered web page 218 may be swapped in to continue loading as the active page.

The memory 202 may further comprise a prerender module 210 to perform fetching of a next web page as identified by the navigation prediction module 208. The prerender module 210 sends a network request for the web page identified to be the likely next navigation destination that the user will select. The web page received in response to this request is then stored in the browser 206 as the prerendered web page 218. In some aspects, the web page request generated by the prerender module 210 is identical to a standard web page request. In some aspects, the web page request generated by the prerender module 210 comprises certain features to facilitate the prerender process.

The memory 202 may also store a client navigation history 212 and an aggregate navigation history 214. The client navigation history 212 comprises a set of navigation events associated with past activity of the browser 206. The client navigation history 212 may track a set of visited URLs, also known as a "clickstream," which tracks an order in which the user typically visits URLs (e.g. when the user visits a news website, they tend to next select a URL corresponding to the top story of the day), a set of access times associated with the URLs, and the like. In some aspects, the client navigation history 212 comprises a set of URLs and a frequency with which the user has visited each URL. In some aspects, the client navigation history comprises a set of URL pairs, representing a source URL and a destination URL. The aggregate navigation history 214 may comprise similar data as the client navigation history 212, but keyed to multiple users rather than a single user. As with the client navigation history 212, the aggregate navigation history 214 may be stored as a set of URLs and a frequency for each, or a set of URL pairs representing a transition from a source URL to a destination URL.

The client navigation history 212 and aggregate navigation history 214 may represent data collected using one or more browser add-ons, scripts, or toolbars. In some aspects, the client navigation history 212 and/or aggregate navigation history 214 are maintained on a remote server, such as the server 104, and provided to the computing device 200. The computing device 200 may maintain separate records to facilitate the predicting of a next likely navigation event, or it may act in concert with remotely stored data. In some aspects, only aggregate navigation history 214 pertaining to the particular web page the user is currently viewing is provided to the computing device 200 (See FIGS. 6 and 8).

As described above, the aggregate navigation history data 214 can be maintained in an anonymous fashion, with privacy protections for the individual client data that comprises the aggregate navigation history, including, for example, anonymization of personally identifiable information, aggregation of data, filtering of sensitive information, encryption, hashing or filtering of sensitive information to remove personal attributes, time limitations on storage of information, and/or limitations on data use or sharing. The aggregate navigation history 214 data can be anonymized and aggregated such that individual client data is not revealed.

Figure 3:
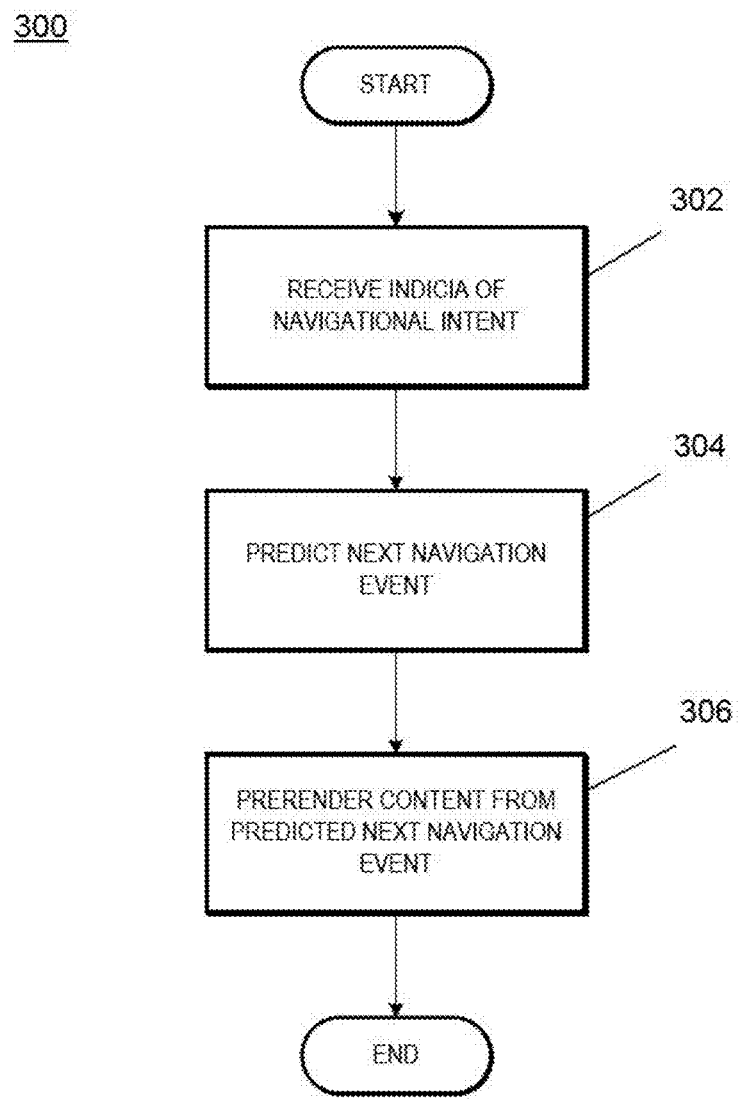
FIG. 3 is a flow diagram depicting an example method for prerendering a web page based upon a predicted navigation event in accordance with aspects of the disclosure.

FIG. 3 is a flow diagram depicting an example method 300 for prerendering a web page based upon a predicted navigation event in accordance with aspects of the disclosure. Aspects of the method 300 operate to identify one or more likely navigation destinations from a set of navigation indicators, and then prerender the identified navigation destinations. The method 300 may be performed by a computing device, such as the computing device 200, to eliminate delays in the user web browsing experience by prerendering web pages that are identified as likely navigation targets by the user. For example, the method 300 may be performed by elements of the browser 206, the navigation prediction module 208, and the prerender module 210 acting together. While aspects of the method 300 are described with respect to the computing device 200, the method 300 may also be performed by the server 104, or any device with hardware and/or software designed to accept instructions.

At stage 302, the computing device 200 receives one or more indicators of navigational intent. Navigational intent may be any action that would tend to indicate that the user will generate a particular network request, such as a request for a particular web page. For example, the indicators may provide metrics by which to determine what the particular request will be, such as a confidence value. For example, the user may navigate to a certain web page, from which they generally navigate to another certain web page based upon their browsing history, or the user may move his mouse cursor towards a particular hyperlink embedded within a web page. In some aspects, the indicator is received from a remote server, such as a search engine that embeds an indicator within search results, indicating that most users that submit a particular search query select a particular search result.

At stage 304, after receiving the indicator of navigational intent, the computing device 200 attempts to predict the most likely navigation event. In short, the computing device 200 makes a best guess of to where the user is likely to navigate next, based upon the indicator. Methods of performing this prediction are described below. (See FIGS. 4-12).

At stage 306, the computing device 200 prerenders the content from the predicted next navigation event as determined at stage 304. The prerendering process may include storing a prerendered web page within a browser, such as the prerendered web page 218. The computing device 200 may prerender a single web page predicted as the most likely navigation event, or the computing device 200 may prerender multiple pages. In some aspects, the computing device 200 determines the number of pages to prerender based upon one or more system capabilities of the computing device 200, such as available system resources, available network bandwidth, processor speed, installed memory, and the like. In some aspects, the number of pages to prerender may be configurable in one or more user settings. After prerendering the content associated with the navigation event(s), the method 300 ends.

Multiple methods for predicting a next navigation event are provided below. While each method is described separately, it should be appreciated that aspects of the methods may be combined to improve navigation prediction operations.

Figure 4:
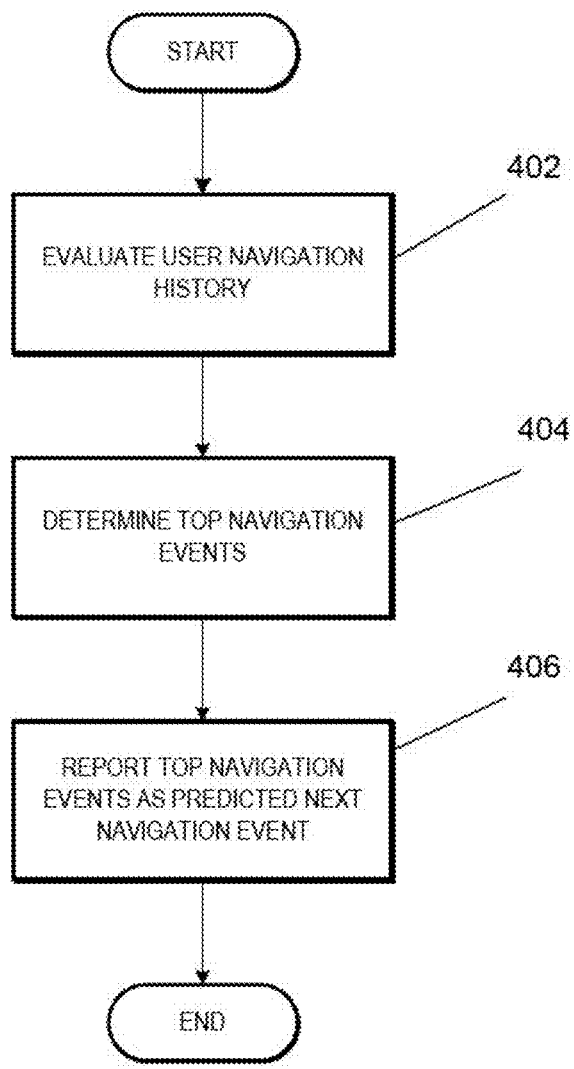
FIG. 4 is a flow diagram depicting an example method for predicting a navigation event based on a client navigation history in accordance with aspects of the disclosure.

FIG. 4 is a flow diagram depicting an example method 400 for predicting a navigation event based on a client navigation history in accordance with aspects of the disclosure. The method 400 provides for storing a navigation history for a user, and predicting a next navigation event based upon a navigation history of a particular user. As above, the method 400 may be performed by a computing device such as the computing device 200. In particular, the method 400 may be performed by a navigation prediction module executing on a processor, such as the navigation prediction module 208.

At stage 402, the computing device 200 tracks a user navigation history. For example, the computing device 200 may store records of web pages visited by the user, such as the browsing history commonly maintained in web browsers. The browsing history may comprise the URLs of the web pages visited by the user, the order in which the URLs were visited, and the manner in which the user selected the URL (e.g. whether the URL was a clicked hyperlink, typed into an address bar, a redirect operation from another web page, etc.).

At stage 404, the computing device 200 determines a most likely navigation event or events based upon the user navigation history. The most likely navigation events may be determined by identifying the globally most visited pages for the user, or the navigation events may be associated with one or more current criteria. For example, the computing device 200 may examine the user's navigation history to determine that, when the user is viewing a particular news web page, they almost always select a link to the top news story on that page, or that when the user first opens the browser in the morning, they are likely to navigate to their bank account page to check their daily balance. The computing device 200 may employ various rules, heuristics, and filters to determine the most likely navigation event from the user history. The computing device 200 may associate each navigation event with a particular confidence value, indicating the likelihood that the user will select each navigation event. These confidence values may then be used to sort the navigation events to determine the most likely navigation event. A method to determine a confidence value for a given navigation event is described further below (See FIG. 5).

At stage 406, the computing device 200 reports the most likely navigation event as the predicted navigation event. For example, these predicted most likely navigation event may then be employed by the method described above (See FIG. 3) to facilitate prerendering of the web pages associated with the most likely navigation event.

Figure 5:
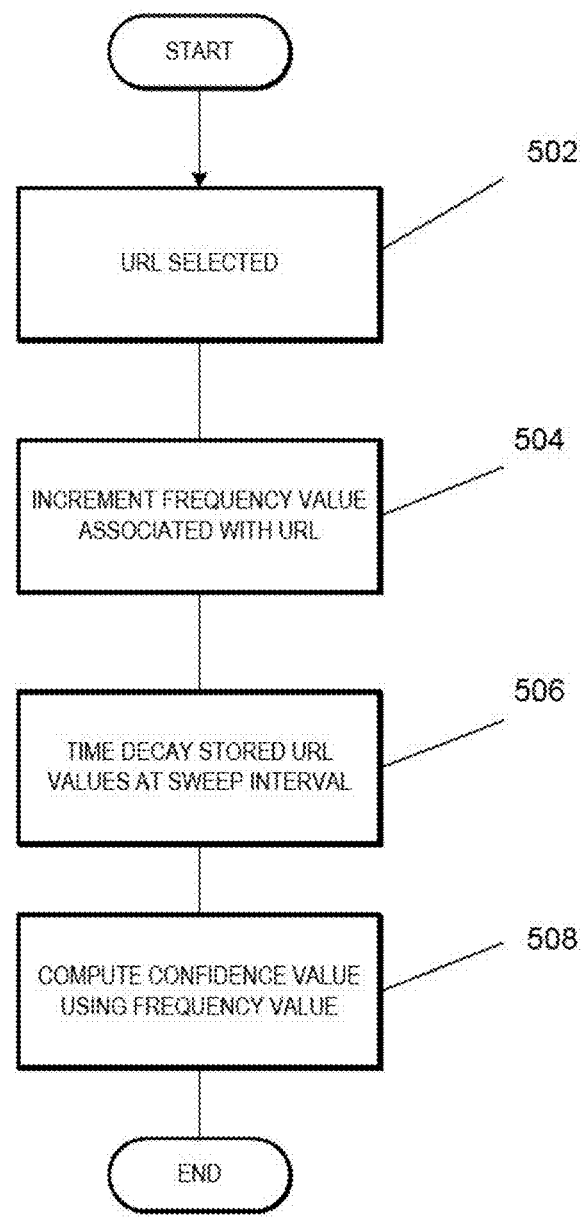
FIG. 5 is a flow diagram depicting an example method for computing a confidence value for a URL using a client navigation history in accordance with aspects of the disclosure.

FIG. 5 is a flow diagram depicting an example method 500 for computing a confidence value for a URL using a user navigation history in accordance with aspects of the disclosure. The method 500 is operable to track navigation events input by the user and to maintain a frequency value for each stored event. The method 500 may be employed to build a client navigation history as used by the method 400, and stored on the computing device 200 as the client navigation history 212.

At stage 502, the computing device 200 tracks the selection of a particular URL. For example, the user may type a URL for a news site into the browser, or click a link on a page. The computing device 200 may monitor the navigation events using functionality built into the browser 206, through a browser extension such as a plug-in or toolbar, or via a third party application executing in tandem with the browser.

At stage 504, the computing device 200 increments a frequency value associated with the URL selected at stage 502. For example, the computing device 200 may track a frequency value associated with each URL selected by a user. The frequency value is a data metric used to rank a number of visits to a particular web site or the number of times a particular navigation event is selected. In response to a selection operation, the computing device 200 may increment the frequency value associated with the URL, for example by 1.0, 5.0, 10.0, 0.5, or any other value. The frequency value associated with the URL represents how often the user has selected the particular URL, and thus is an indicator of how likely the user is to select the URL in the future.

At stage 506, the computing device 200 time decays the stored frequency values for the URLs after a given "sweep interval". Decaying the URL frequency values in this manner allows for current browsing habits to be more heavily weighted than previous browsing habits. As an example, the computing device 200 may execute the sweep every 30 seconds, every minute, or every 5 minutes during which the user has selected at least one URL. The sweep interval may be conducted in response to the selection of at least one URL during a particular sweep interval to ensure that the navigation history values are not decayed below a threshold value during periods where the user is inactive. The sweep may decay the stored frequency value associated with the URL by a particular value, such as 0.99, 0.5, or 1.0, or by a percentage value, such as 5%, 10%, or 50%. Once the value associated with the URL drops below a given threshold, for example, 0.3, 1.0, or 5.0, the URL may be removed from the list of possible navigation destinations to avoid the list growing too large. After conducting the decay process, the frequency values for the URLs may be persisted to a local storage on the computing device 200, or sent to a remote storage such as provided by the server 104.

At stage 508, the stored frequency values may be used to determine the relative frequency with which the user visits particular web sites. The frequency value thus provides a basis from which a confidence value associated with a navigation event leading to each web site may be derived. In some aspects, the frequency value itself may be provided as the confidence value. In some aspects, the confidence value is determined by comparing a frequency value for a particular web page with the entire user navigation history. For example, the navigation event with the higher frequency value may be associated with a particular percentage confidence value, the second highest frequency value a lower percentage, and the like. In some aspects, the confidence value is determined by frequency value by the total number of logged navigation events. For example, the frequency value of a particular URL may be divided by the sum of all frequency values to determine a confidence value.

For example, a user may be in the process of buying a home, and thus regularly checking financial and banking websites for mortgage rates. During this time, these financial and banking sites would have high values and thus be more likely to be prerendered, thus improving the user experience while searching for a mortgage rate. After completing the home purchase process, the user is likely to lose interest in day to day rate fluctuations, and thus it is no longer optimal to prerender these websites, since the user is unlikely to visit them. As such, providing for a time decay value allows these sites to fall off of the list over time.

Figure 6:
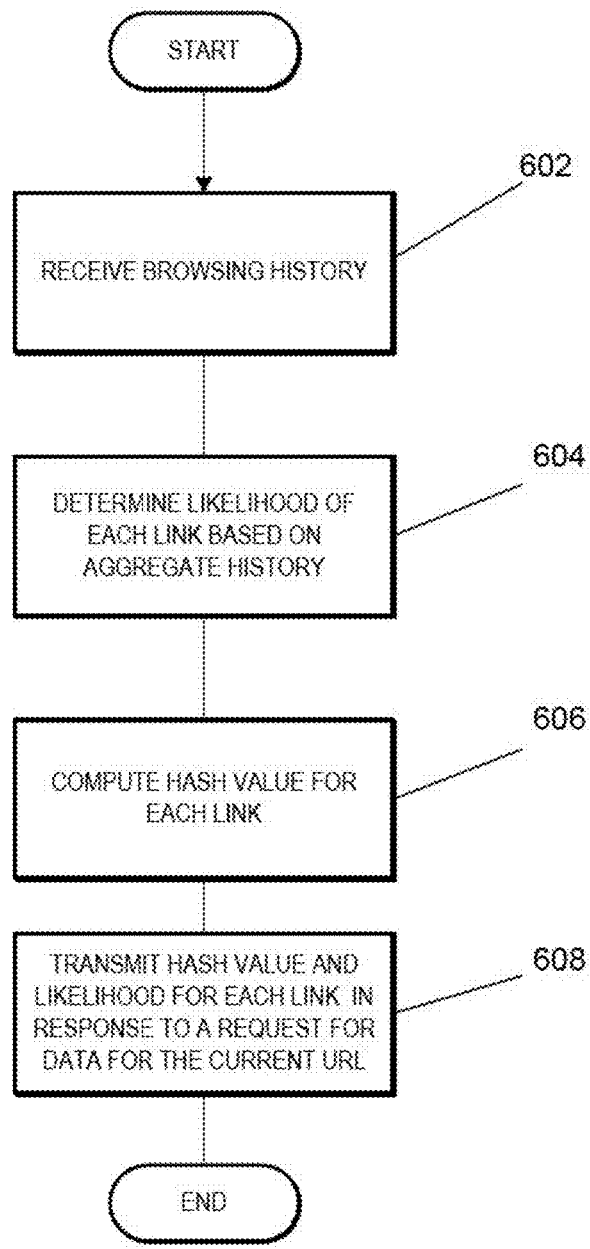
FIG. 6 is a flow diagram depicting an example method for predicting a navigation event based on an aggregate navigation history in accordance with aspects of the disclosure.

FIG. 6 is a flow diagram depicting an example method 600 for predicting a navigation event based on an aggregate navigation history in accordance with aspects of the disclosure. The method 600 is operable to track navigation events voluntarily submitted by users to determine likely navigation patterns. The navigation patterns are then analyzed, such as by a server 104, and supplied to the user to facilitate navigation event prediction during the browsing process. For example, a server, such as the server 104, may send updates to a computing device, such as the computing device 200, as the user browses to different pages, to provide information on which link displayed on a given page is most likely to be selected based on the aggregate navigation history.

At stage 602, the server 104 receives a set of navigation information comprising a browsing history. The browsing history is preferably provided by using an "opt-in/out" method, where the user specifically enables (or disables) reporting functionality to provide elements of their browsing history to the server 104. In addition, personally identifying data can be anonymized and aggregated before it is stored or used, such that no personal information is stored or accessible. A browsing history may be tracked and provided to the server 104 via a browser plug-in or toolbar installed on the user's computing device which tracks the user's browsing history, or by the web browser itself. The browsing history may be combined with other received browsing histories to create a set of aggregate data used in a similar manner as the client navigation history described with respect to FIG. 4, to predict a likely navigation event. The received navigation history may be anonymized to remove any personally identifying information. In some aspects, the received navigation history is received with individual URLs and/or transitional URL pairs provided in a hashed data format to remove any personally identifying information prior to transmission to the server 104.

At stage 604, the server 104 determines a confidence value for each URL on a particular web page, based on the navigation information received at stage 602. For example, the server may employ a method similar to that disclosed above with respect to FIG. 5 for generating confidence values for URLs on a page, except the navigation events are determined based upon aggregated data instead of specific user data. As above, the server 104 may compute confidence values based upon the frequency values derived from the navigation information. In some aspects, confidence values are determined by the percentage of the time that users selected a particular navigation event when they were presented with the choice to select the particular navigation event. The transitional URL pairs provide for the determination of a confidence value by dividing a frequency value of a source/destination URL pair by a total number of appearances of the source URL. In some aspects, the server may determine navigation events based upon transitions from a first page to a second page, rather than from a pure visit frequency metric. The server 104 may maintain an index of web pages and associated URLs and confidence values for each link on the web page, such as in a database. For example, a news site may have five URLs pointing to different news stories. The server 104 may receive aggregate data indicating that one of the five news stories is selected 60% of the time, with the other four being selected 10% of the time each. As such, the server 104 would index the page in a database with a 60% likelihood for the first story link, and 10% likelihoods for each of the other four story links.

In some aspects, the server 104 maintains history data in a confidential manner, such as by converting each URL to a hash value at stage 606. In this manner, the server 104 may provide predicted URL data to a client device without disclosing any personal user data. For example, a user may visit a banking web page that has a particular user name and password login. Depending upon the user, the banking web page may provide URLs to each account the user possesses. Each user accessing the page may have a different set of links provided, depending upon the accounts the user has with the bank. By converting the links on the page to non-reversible hash values, the server 104 may provide confidence values that are not associable to links on the page unless the user also possesses access to the same links (e.g., the client can apply the hash function to links they already possess on the currently viewed page to determine if the confidence values apply). As described above, in some aspects, the hash value is computed by the computing device 200 prior to sending navigation history data to the server 104. In this manner, the server 104 may receive the navigation history data in the hashed format, without the need to compute a hash value.

At stage 608, the server 104 transmits the hash values and confidence values associated with the hash values to a client device, such as the computing device 200. The transmittal may be in response to a request from the computing device 200 for a particular URL. In some aspects, the server 104 may transmit the hash values and confidence values in response to a request for such values from a service executing on the client device 200. For example, when the computing device 200 requests the news web page described above, the server 104 provides the hash values and confidence values for the five story links present on that page. The computing device 200 may also request data for particular link hash values by first generating a hash value on the client side, then requesting a confidence value for the particular hash value from the server 104.

Figure 7:
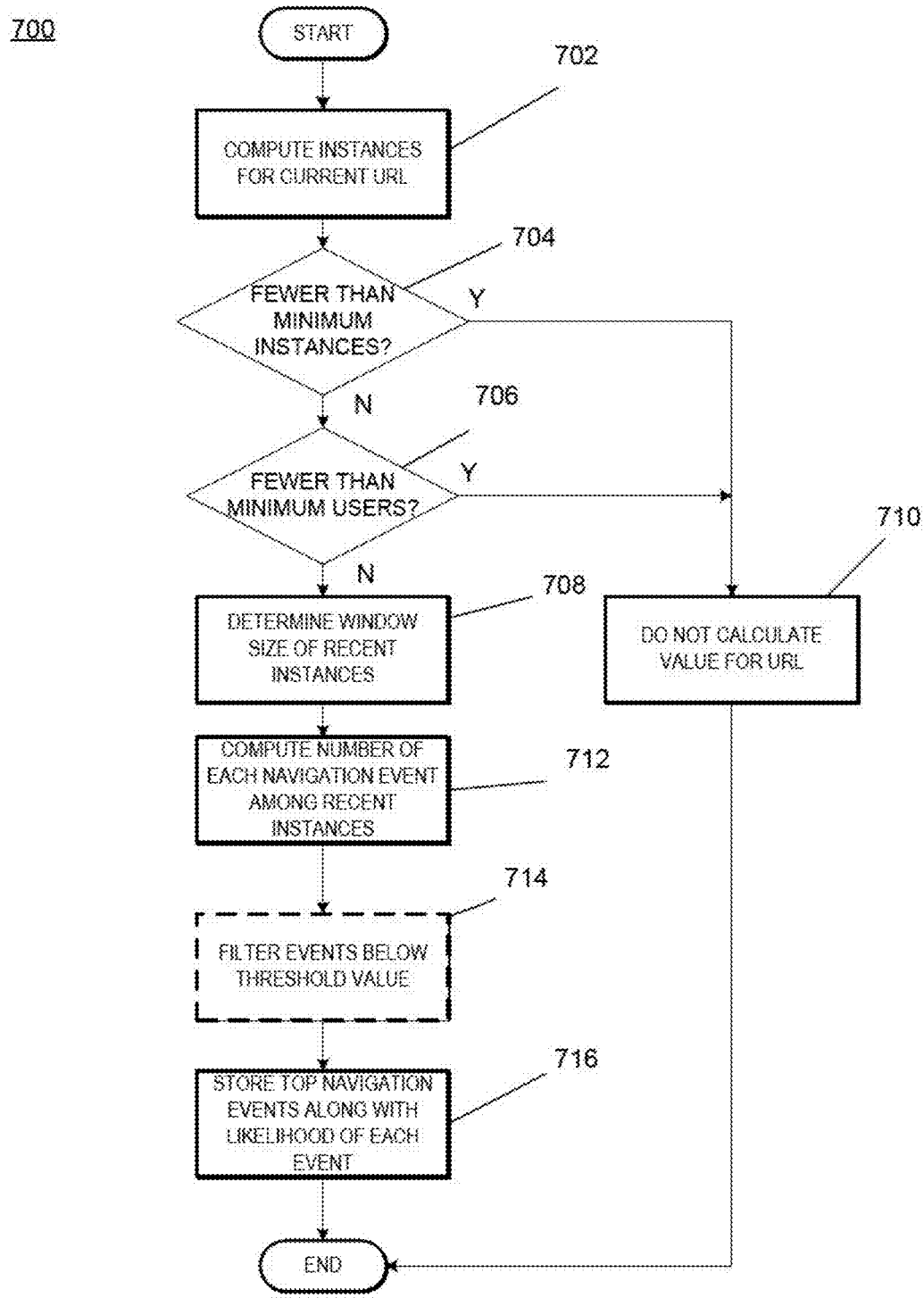
FIG. 7 is a flow diagram depicting an example method for computing a confidence value for a URL using an aggregate navigation history in accordance with aspects of the disclosure.

FIG. 7 is a flow diagram depicting an example method 700 for computing a confidence value for navigation events associated with a URL using an aggregate navigation history in accordance with aspects of the disclosure. The method 700 serves to compare navigation events from a given URL received from a plurality of users, in order to determine how likely each individual navigation event is. The confidence values may be determined in relation to a particular "source" web page, with different confidence values for each URL depending upon the page the user is currently viewing. For example, the confidence values may be used above as described with respect to stage 604 of the method 600 (see FIG. 6).

At stage 702, the server 104 examines received browsing histories and computes a number of instances for each navigation event as associated with a particular URL. As described above, the instance value may be a percentage or a raw number.

At stage 704, the server 104 may determine if the number of visits to the URL exceeds a minimum threshold of statistical significance. For example, five visits to a particular URL may not provide statistically significant data sufficient to reasonably predict a likely navigation event away from the URL. For example, if the number of instances of the event is less than 1000, the server 104 may proceed to stage 710, and not calculate a probability for the event because the sample size is insufficient.

At stage 706, the server 104 may determine if a minimum number of users have submitted data regarding the URL to provide statistically significant data. For example, the method 700 may require that at least 50 users have provided data in order to compute and store a confidence value for the navigation event. Otherwise the method 700 may proceed to stage 710 and disregard the event until a sufficient number of users have provided data. As above, the threshold value may fluctuate depending upon the size of the dataset.

At stage 708, the server 104 determines a window size of recent instances. The window size refers to the number of latest visits to the URL that will be examined to determine the confidence value, or a length of time to search back through the instances. The window size may be determined based on the amount of traffic the URL receives, how often the content of the URL changes. For example, a news website that has constantly changing content might require a small instance window, because links from the regularly changing URL would grow stale. A website with a small amount of traffic would typically require a longer window size in order to gather enough results for statistical significance. The window size might be set at 50 instances, 100 instances, 1000 instances, all instances within the last hour, within the last day, within the last week, or the like.

At stage 712, the server 104 computes the number of times each particular navigation event, such as the next URL visited for the current URL, occurs within the instances defined by the window size determined at stage 710. For example, out of 1000 visits to a news website, a particular article might be selected 600 times, resulting in a confidence value of 60% for navigating to that article from the URL. While the present example primarily relates to determination of a navigation event based upon a number of accesses as a percentage of total navigation events, additional heuristics may also be used to derive the likely event based upon information supplied by the user, such as the previous navigation event (e.g. the website that led to the currently analyzed URL), the time of day (e.g. users are more likely to check news sites when in the morning when they arrive at work), the user's location (e.g. users in a particular geographic region are likely to check sports scores for local teams), or other demographic information.

At stage 714, the server 104 optionally compares the confidence values for the navigations events from the URL with a threshold value. If the confidence values do not meet the threshold value, the server 104 may identify a subset of available navigation events, as possible predicted likely navigation events. In this manner the server 104 avoids predicting navigation events when the event does not have a statistically significant likelihood of occurring, thus potentially saving bandwidth on prerender operations on pages that are unlikely to be visited. The threshold may be set at a variety of different values, such as 5%, 25%, 50%, or 75%. In some aspects, the threshold may be dynamically altered based upon the number of navigation links present at the URL, the type of URL, the traffic of the URL, the speed at which content changes at the URL, and the like. If the confidence values do not meet the minimum threshold, the server 104 may filter out the possible events that do not meet the minimum threshold.

If the navigation event or events meet the minimum threshold, or the method 700 does not check for a minimum threshold, the most likely navigation event or events and the likelihood for each event are stored along with the URL at stage 716. The navigation events and confidence values may be supplied in response to a request to the user, such as occurs at stage 608 described with respect to FIG. 6. The method 700 ends after computing and storing the confidence values for the navigation events associated with the URL.

Figure 8A:
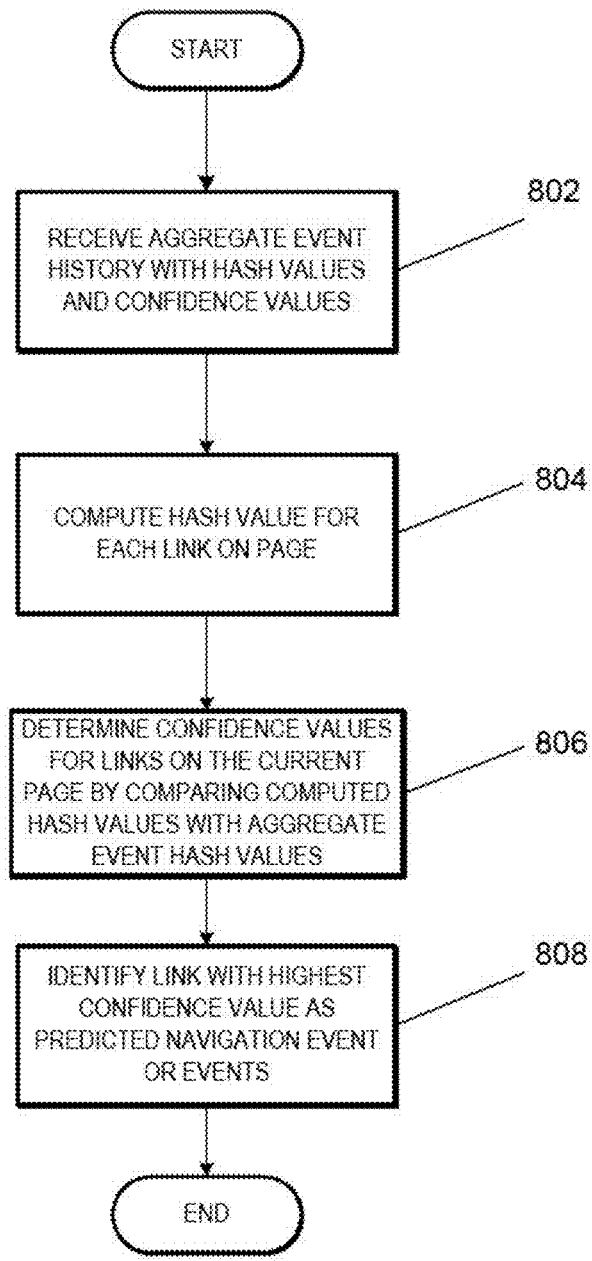
FIG. 8A is a flow diagram depicting an example method for predicting a navigation event based on an aggregate navigation history using hash values to anonymously manage link data in accordance with aspects of the disclosure.

FIG. 8A is a flow diagram depicting an example method 800 for predicting a navigation event based on an aggregate navigation history using hash values to anonymously manage link data in accordance with aspects of the disclosure. The method 800 provides logic by which a computing device 200 may predict a navigation event based upon data received from a server 104, such as the data generated by the method 700 described with respect to FIG. 7.

At stage 802, the computing device 200 receives a set of data from a remote server 104, the set of data comprising information associated with an aggregate browsing history of a web page. This aggregate data may be received in response to a request made by the computing device 200 in response to navigating to a particular web page. The aggregate data may represent a collection of data received by a remote server from a plurality of users. For example, a web browser plug-in may allow the user to "opt-in/out" of functionality that may send their anonymized navigation history to a remote server. The remote server may then collect navigation histories from a plurality of users, stored as an aggregate navigation history, such as described above (see FIG. 7). For example, the navigation prediction module 208 may generate a request to the server 104 every time the user navigates to a web page, for the aggregate browsing data associated with that web page. The navigation prediction module 208 may then predict a likely next navigation event using the received data, so as to supply the prerender module with a next page to prerender to improve the browsing experience.

Due to the data's aggregate nature, it can be provided as a series of hash values to protect individual user information, as described above with respect to FIG. 6. As such, the computing device 200 associates the received hash values and confidence values with the links present on the current URL. To begin this process, at stage 804, the computing device computes a hash value for each link on the current page using the same hash function as used by the server 104 to anonymize the link data. As described above, in some aspects the hash value is computed on the computing device prior to sending navigation history data to the server. In such cases, the hash value would match the original computed value determined by the computing device prior to the navigation event being transmitted to the server, rather than a value computed on the server.

At stage 806, the computing device 200 compares the computed hash values with the received hash values from the server 104. In this manner, the computing device 200 may match the confidence values and hash values received from the server 104 with the links available for the user to select on the currently viewed web page. The confidence values indicate a likelihood that a particular navigation event associated with the hash value will be selected. The computing device 200 may thus map the currently viewable links with the received confidence values.

At stage 808, the computing device 200 identifies the link or links with the highest confidence value or values as the predicted next navigation event. The method 800 ends after predicting the next navigation event.

Figure 8B:
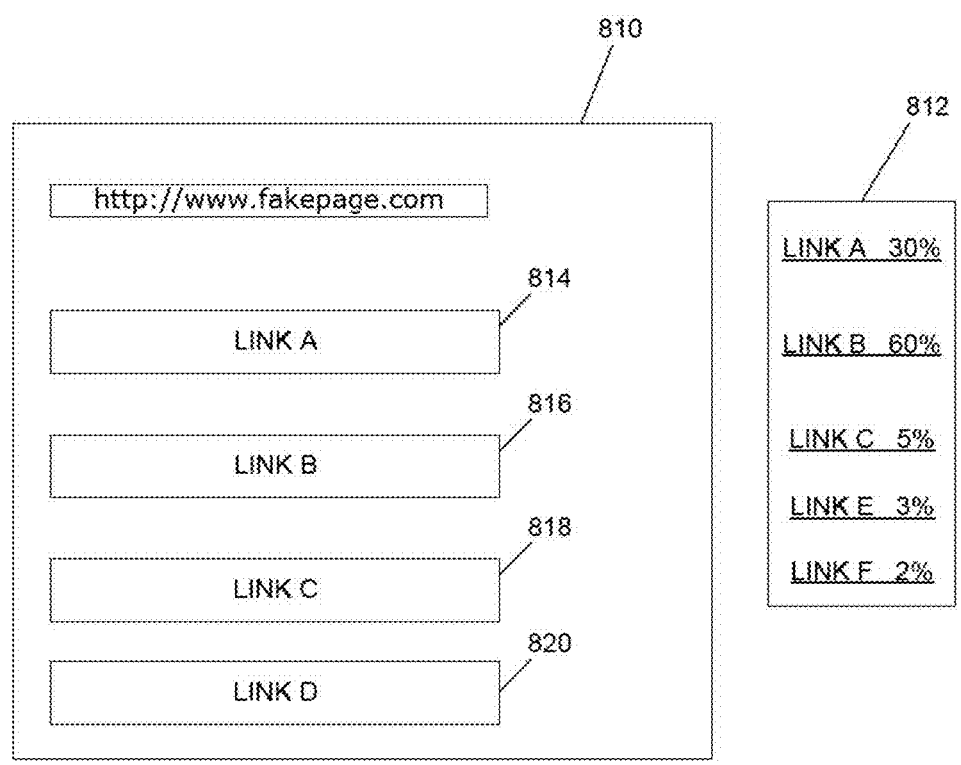
FIG. 8B is an illustration of an example web browser employing an example method for predicting a user navigation event based on an aggregate navigation history in accordance with aspects of the disclosure.

FIG. 8B is an illustration of an example interface 810 of a web browser employing an example method for predicting a user navigation event based on a navigation history in accordance with aspects of the disclosure. The illustration depicts a web browser interface 810 displaying a web site and a set of navigation history data 812. The web page 810 comprises one or more links 814, 816, 818, 820. These links 814, 816, 818, 820 may be URLs that, when selected by a user, direct the web browser to display a set of content associated with the selected link.

The navigation history data 812 comprises data associated with the links 814, 816, 818, and two other links, Link E and Link F that are not present for the current user viewing the page. The navigation history data 812 may represent an analysis of the individual user's navigation history (See FIGS. 4-5), or an aggregate navigation history (See FIGS. 6-8). The navigation history 812 comprises information about the links 814, 816, 818, and a confidence value associated with each link.

The navigation history 812 may be used by other aspects of a computing device 200, such as the navigation prediction module 208, to predict the next navigation event. For example, in the present illustration, according to the navigation history 812, there is a 30% chance the user will select Link A 814, a 60% chance the user will select Link B 816, and a 5% chance the user will select Link C 818. Link D 820 does not have any associated data stored in the navigation history 812. The lack of data for Link D 820 may be explained in a variety of manners, such as that the chance of selection of Link D 820 is below a threshold value, or that no data has been submitted for Link D 820. The navigation history 812 also displays a non-zero chance of selecting two links that are not present, Link E and Link F. These links may have been removed from the web page in an update, or they may not be visible to all users, such as the user currently accessing the page. In accordance with aspects of the disclosure, the navigation prediction module 208 identifies Link B 814 as a predicted next navigation event because the confidence value of Link B 814 is greater than the values for Link A 812 and Link C 818.

Figure 9:
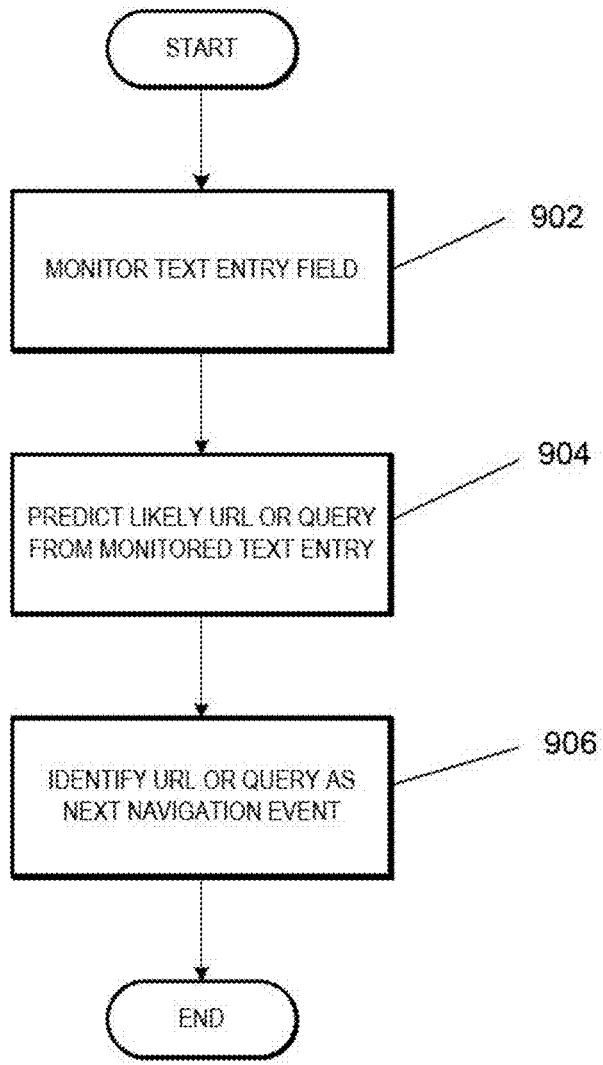
FIG. 9 is a flow diagram depicting an example method for predicting a navigation event based on data entered within a text field in accordance with aspects of the disclosure.

FIG. 9 is a flow diagram depicting an example method 900 for predicting a navigation event based on data entered within a text field in accordance with aspects of the disclosure. The method 900, when executed by a client device such as the computing device 200, is operable to predict a next navigation event based upon text entry. The client device 200 may then predict the next likely navigation event by comparing the entered text with a set of historical navigation data.

At stage 902, the computing device 200 monitors entry within a text field, such as a URL navigation bar in a web browser, or a query entry field on a search engine page. The text entry may comprise a destination, such as a typed URL, a search query to be submitted to a search engine, or other data entered within a web form.

At stage 904, the computing device 200 predicts a navigation event based upon the entered text. For example, the computing device 200 may compare the entered text with a user browsing history. As the user enters text, the computing device 200 may search the user browsing history to compare the partially entered text with previously visited web pages.

For example, the user may enter "www.goo" and the computing device 200 may predict that the user has begun typing "www.google.com" based upon the user's past visits to www.google.com. In another aspect, the user may enter a partial query into a search engine query entry field. As the user enters the query, the browser may begin prerendering a results page for the most likely queries associated with the text that the user has entered.

At stage 906, the navigation events as identified at stage 906 are provided as the predicted navigation events to be used elsewhere, such as provided by the navigation prediction module 208 and used by the prerender module 210 to prerender the predicted content.

Figure 10:
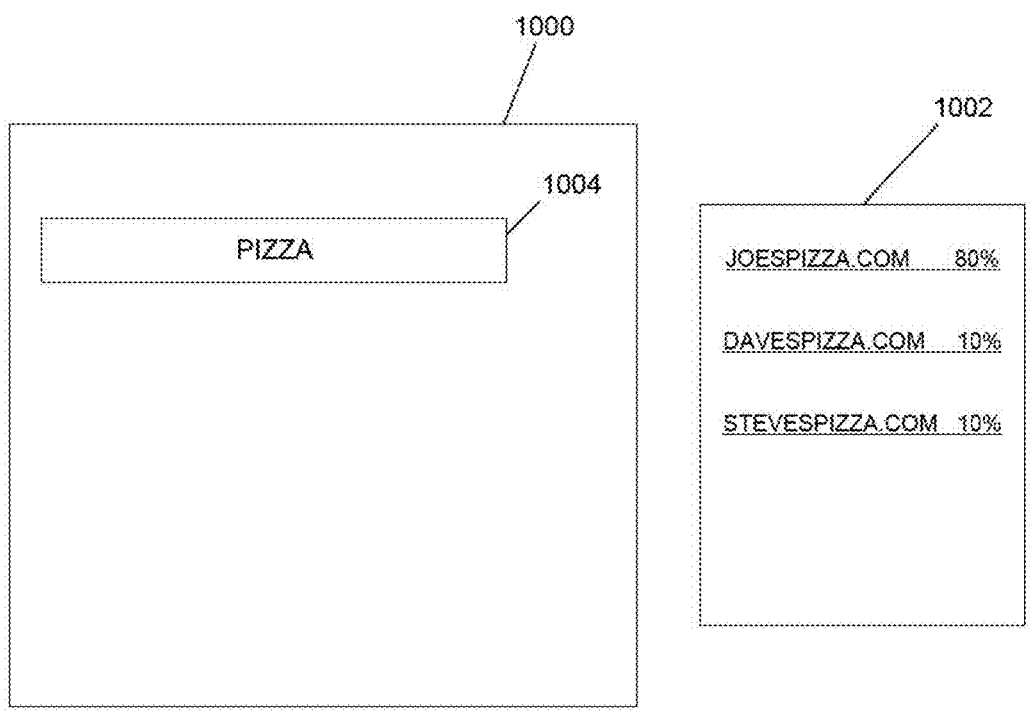
FIG. 10 is an illustration of an example web browser employing an example method for predicting a user navigation event based on data entered within a text field in accordance with aspects of the disclosure.

FIG. 10 is an illustration of an example web browser interface 1000 employing an example method for predicting a user navigation event based on data entered within a text field in accordance with aspects of the disclosure. The illustration depicts a web browser interface 1000 and a set of links associated with confidence values 1002. For example, a web browser associated with the web browser interface 1000 may execute on the computing device 200 as described above. The web browser interface 1000 comprises a text entry field 1004. In some aspects, the text entry field 1004 is an address bar for entering a URL. In some aspects, the text entry field 1004 may be part of a web page, such as a search string entry field on a search engine web site.

As the user enters text within the text entry field 1004, the computing device 200 determines a most likely destination from the entered text. For example, the user may enter the word "Pizza" in the text entry field 1004. Based upon the user's intent to navigate to a page related to Pizza, the system determines there is an 80% chance the user wishes to navigate to "joespizza.com", and a 10% chance to navigate to each of "davespizza.com" or "stevespizza.com". The percentage values for each link may be determined by a variety of data analysis methods, taking into account factors such as the user's navigation history, an aggregate navigation history, sponsorship from various result web pages, and the like. In the previous example, "joespizza.com" would be identified as the predicted navigation event based upon the fact that it is associated with the highest percentage.

Figure 11:
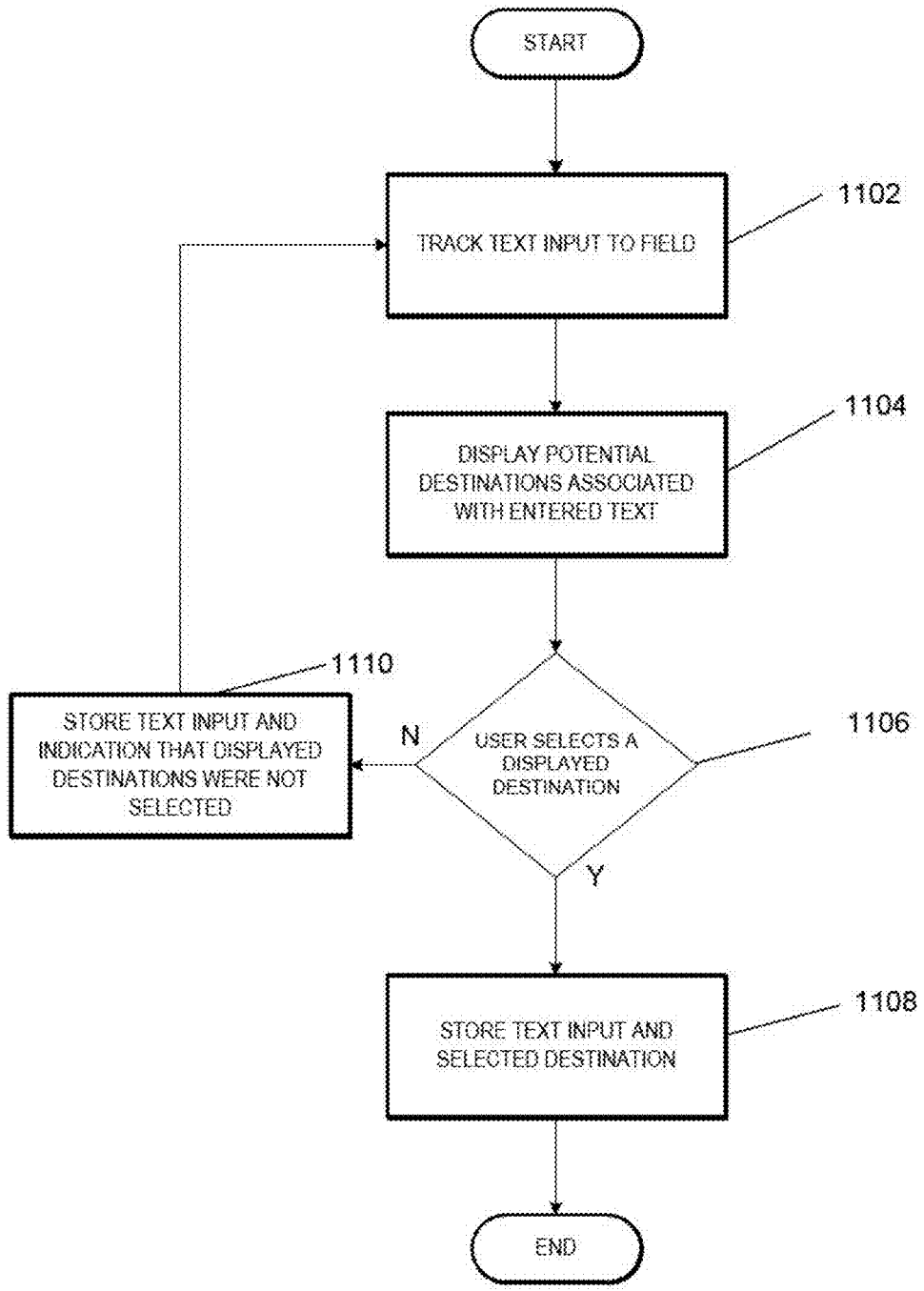
FIG. 11 is a flow diagram depicting an example method for generating navigation history data used to predict a user navigation event in accordance with aspects of the disclosure.

FIG. 11 is a flow diagram depicting an example method 1100 for generating navigation history data used to predict a user navigation event in accordance with aspects of the disclosure. The method 1100 collects data regarding user browsing habits to assist with the prediction of navigation events used in a prerender operation. The method 1100 locally stores text that a user enters within a text field to perform navigation operations. As the user enters the text, the text field prompts the user with possible destinations associated with the entered text. For example, if the user begins to type "www.goo" in the text field, the text field may prompt the user with a link to navigate to "www.google.com". Aspects of the method 1100 track the text that the user entered and whether or not the user selected a particular link in order to assist with the prediction of later link selections based on text entry.

For example, web browsers typically allow a user to enter text in an address field. Some web browsers display possible destinations in response to text entries within this address field. The possible destinations may be determined by a variety of methods, such as by examining a user's personal browsing history, querying a search engine, using an aggregate browsing history, or any other method of identifying possible destinations based on text input.

At stage 1102, the text entered into a text field, such as the text entry field 1004 (see FIG. 10), is tracked. For example, the user may enter "www.g" in the text field.

At stage 1104, potential destinations are displayed to the user based on the entered text. For example, the user may be presented with a list of URLs that begin with the letter "G" in response to the text "www.g".

At stage 1106, one of the displayed links may be selected. For example, the user may select a link for one of the websites beginning with the letter "G" if the website to which the user intends to navigate is displayed from among the displayed destinations.

If the user selects one of the displayed destinations, then at stage 1108 the text input and the selected destination are stored for later reference. This pair of inputs may be saved in a probability map. For example, this probability map may be updated for every navigation event. The probability map may include data for every text input to the text field, a top selected suggested destination displayed in response to the text input, and a frequency of the number of times the user has selected the top suggested destination and the number of times the user has not selected the top selected destination. The frequency data is thus indexed by the text entry. Such data may be used to determine a probability that the user will visit the displayed top destination when a given set of text is entered into the text field. The probability map may also be indexed by a pair of values corresponding to the text entry and the displayed top destination, where the displayed destination is determined based on user browsing history, results received from a search engine, or another method. The probability map may also be indexed by a more complex key. For example, the key may also contain information as to whether the user explicitly requested a search query (e.g., by prefixing the text entry with '?'), or if the text query is determined to be a search query by other means.

If the user does not select one of the displayed destinations, then at stage 1110 the text input and the fact that the user did not select any of the displayed destinations are saved in the probability map. Additional text input continues to be tracked, such that a text entry of "www.go" is indexed as a different value in the probability map from "www.g" with a corresponding unique probability value associated with displayed results.

Figure 12:
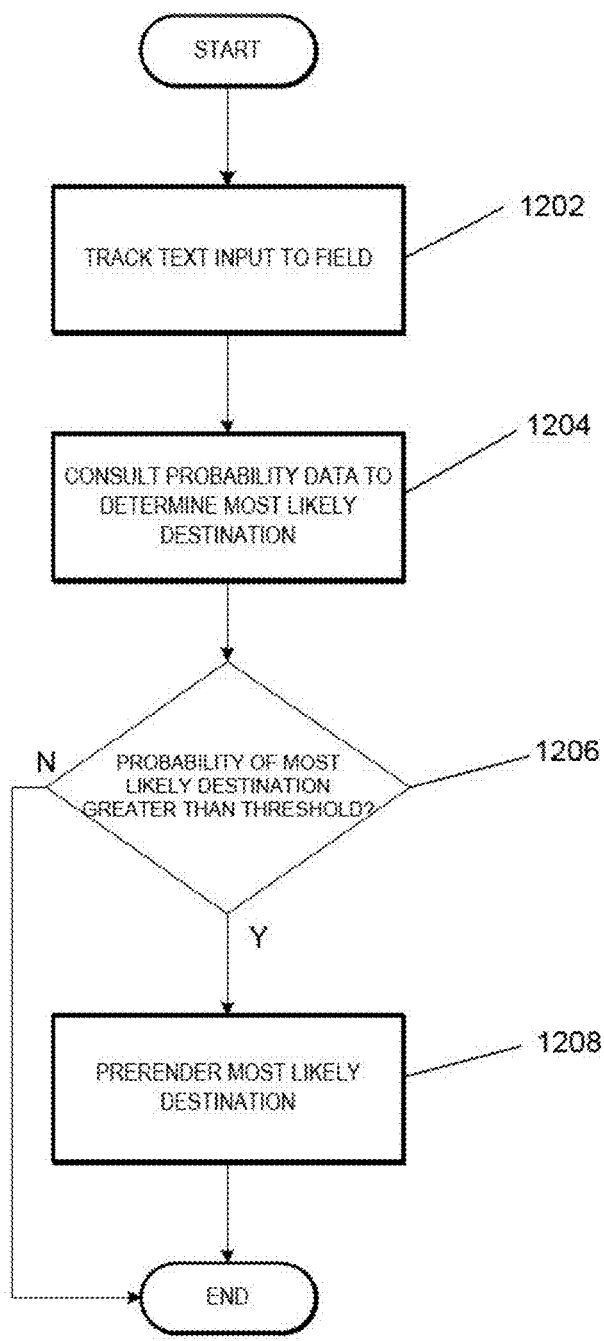
FIG. 12 is a flow diagram depicting an example method for predicting a user navigation event using navigation history data based on text entry within a text field in accordance with aspects of the disclosure.

FIG. 12 is a flow diagram depicting an example method 1200 for predicting a user navigation event using navigation history data based on text entry within a text field in accordance with aspects of the disclosure. The method 1200 functions to determine a most likely destination based on text input to a text field. Aspects of the method 1200 may utilize probability map data, such as the data captured by the method 1100 as described above (see FIG. 11). Aspects of the method 1200 may predict a particular destination link as a viable prerendering candidate by comparing the probability of a particular destination with a threshold value.

At stage 1202, text input to a text field, such as the text entry field 1004, is tracked to correlate the entered text with a probability map.

At stage 1204, the text entered is correlated to the text entries by which the probability map is indexed. When the user types a character in the text field, the probability map may be consulted to retrieve the counts for the given text input and/or displayed top result. For example, the probability of a given website may be determined in response to a text entry by looking up the data associated with the text entry in the probability map. In another aspect, the text entry may result in the display of one or more possible destinations, and the text entry and the top displayed possible destination may be used to look up the data within the probability map.

The probability that the user will select a particular web page may be determined by examining the frequency with which the user has selected the particular page. For example, the probability data may include the frequency with which the user has selected a web page in response to a particular text input. The probability that the user will select the particular web page may be determined by examining the number of times the user has selected the web page, divided by the sum of the number of times the user has selected the web page, and the number of times the user has not selected the web page. A formula for determining a probability of selection of a given displayed link may be determined as:

$$p = \frac{\text{selected}}{\text{selected} + \text{unselected}} \quad \text{(Eq. 1)}$$

P is the probability that the particular page will be selected in response to the text entry. Selected is the number of times the particular page was selected when displayed in response to the text entry. Unselected is the number of times the page was not selected when displayed in response to the text entry.

At stage 1206, the probability value is compared to a threshold value. A threshold value may be used in this manner to ensure that the particular page is only preloaded when there is a reasonable likelihood that the user intends to navigate to the particular page. This process saves system resources and bandwidth by not prerendering pages that the user is unlikely to access.

At stage 1208, the particular web page identified by the probability map is prerendered if the probability value exceeds the threshold value. For example, the web page may be prerendered when the probability value p exceeds 0.5, 0.95, 0.99, or any other value as determined by the prerender module 210 or configuration settings. The threshold value may be configurable by the user, such as by a configuration setting, or dynamically determined based on a system resource level. In some aspects, all destination web pages that have a probability value greater than the threshold value may be prerendered. In some aspects, the decision to prerender a web page may be determined by available system resources, such as memory, processor utilization, network bandwidth, and the like.

If the probability value does not exceed the threshold value, the method 1200 ends. The method 1200 may continuously repeat as additional characters are entered and removed from the text entry field. Pages that are prerendered via this process may be discarded as additional characters are entered.

The stages of the illustrated methods described above are not intended to be limiting. The functionality of the methods may exist in a fewer or greater number of stages than what is shown and, even with the depicted methods, the particular order of events may be different from what is shown in the figures.

The systems and methods described above advantageously provide for an improved browsing experience. By predicting the next navigation event, the browser can perform prerender operations to minimize the amount of time users wait for web pages to load. Multiple methods to perform the prerender operations provide a flexible and robust system for determining the next navigation event.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A system, comprising:
a memory; and
one or more processors coupled to the memory, the one or more processors being configured to:
determine a confidence value associated with a likelihood of a navigation event from a first network location to a second network location, wherein the confidence value is based on a number of navigation events from the first network location to the second network location relative to a number of visits to the first network location within a window of a given size, and wherein the given size of the window is based on one or more of an amount of traffic to the first network location and how often content at the first network location changes; and
instruct a browser to load content from the second network location based on the confidence value;
wherein the browser provides the content loaded from the second network location for display when a user selects the second network location.

2. The system of claim 1 wherein the given size is based on the amount of traffic to the first network location.

3. The system of claim 2 wherein the given size decreases when the amount of traffic to the first network location increases.

4. The system of claim 1 wherein the given size is based on how often content at the first network location changes.

5. The system of claim 4 wherein the given size decreases when the content at the first network location changes more often.

6. The system of claim 1 wherein the given size represents a given number of the latest visits to the first network location.

7. The system of claim 1 wherein the given size represents the number of visits to the first network location within a length of time.

8. The system of claim 1 wherein determining the confidence value associated with the likelihood of a navigation event from the first network location to the second network location comprises determining the confidence value at a server, and wherein instructing a browser to load content from the second network location based on the confidence value comprises providing the confidence value to a browser located on a client device.

9. The system of claim 1 wherein the number of navigation events from the first network location to the second network location and the number of visits to the first network location are based on an aggregated navigation history of a plurality of users.

10. A method comprising a memory;
determining, with one or more processors, a confidence value associated with a likelihood of a navigation event from a first network location to a second network location, wherein the confidence value is based on a number of navigation instances from the first network location to the second network location relative to a number of visits to the first network location within a given length of time, and wherein the given length of time is based on an amount of traffic to the first network location; and
instructing, with the one or more processors, a client device to load content from the second network location based on the confidence value;
wherein a browser provides the content loaded from the second network location for display when the browser receives instructions to navigate to the second network location.

11. The method of claim 10 wherein the given length of time increases as the amount of traffic to the first network location decreases.

12. The method of claim 11 further comprising determining, with the one or more processors, the confidence value based on the number of navigations from the first network location to the second network location relative to a given number of the latest visits to the first network location, wherein the given number is determined based on the amount of traffic to the first network location.

13. The method of claim 12 wherein the given number decreases as the amount of traffic to the second network location increases.

14. The method of claim 10 wherein the given length of time is based on how often content at the first network location changes.

15. The method of claim 14 wherein the given length of time decreases as the content at the first network location changes more often.

16. The method of claim 10 wherein determining a confidence value associated with the likelihood of a navigation event from a first network location to a second network location comprises determining the confidence value at a server, and wherein instructing a browser to load content from the second network location based on the confidence value comprises providing the confidence value to a browser located on a client device.

17. The method of claim 10 wherein the number of navigation instances from the first network location to the second network location and the number of visits to the first network location are based on an aggregated navigation history of a plurality of users.

18. The method of claim 10 wherein the first network location and the second network location are at different Uniform Resource Locations.

19. A non-transitory computer readable storage medium on which computing-device readable instructions of a program are stored, the instructions, when executed by one or more computing devices, causing the one or more computing devices to perform a method, the method comprising:
determining a confidence value associated with a likelihood of a navigation event from a first network location to a second network location, wherein the confidence value is based on a number of navigation events from the first network location to the second network location relative to a number of visits to the first network location within a window of a given size, and wherein the given size is based on one or more of an amount of traffic to the first network location and how often content at the first network location changes; and
instructing a browser to load content from the second network location based on the confidence value;
wherein the browser provides the content loaded from the second network location for display when a user selects the second network location.

20. The medium of claim 19 wherein the given size is based on how often content at the first network location changes and the given size decreases when the content at the first network location changes more often.

21. The system of claim 19 wherein the given size is based on the amount of traffic to the first network location and the given size decreases when the amount of traffic to the first network location increases.

\* \* \* \* \*